UNITED STATES PATENT OFFICE.

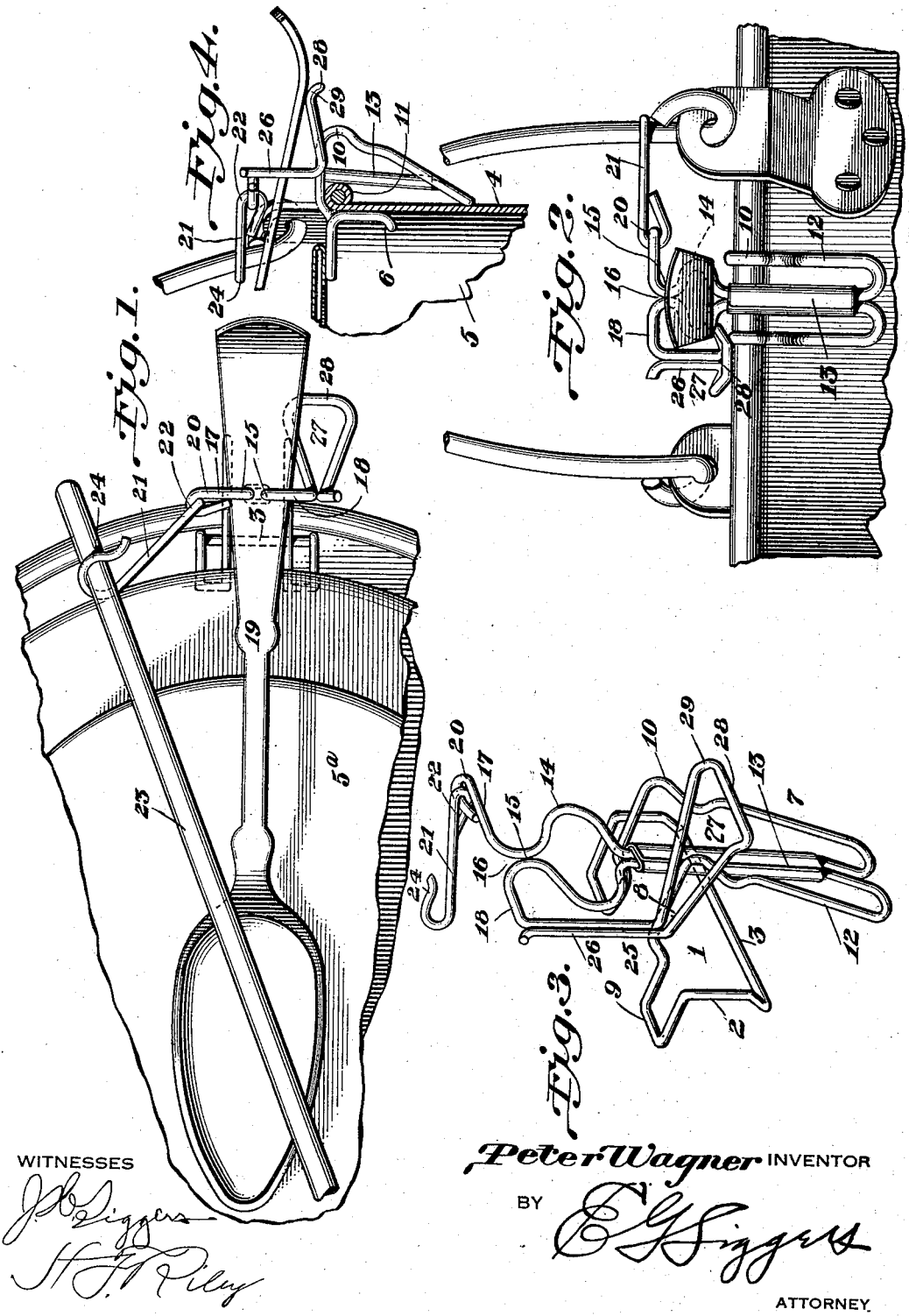

PETER WAGNER, OF ELYRIA, OHIO.

ATTACHMENT FOR COOKING UTENSILS.

1,217,373.　　　　Specification of Letters Patent.　　Patented Feb. 27, 1917.

Application filed March 17, 1914. Serial No. 825,282.

*To all whom it may concern:*

Be it known that I, PETER WAGNER, a citizen of the United States, residing at Elyria, in the county of Lorain and State of Ohio, have invented a new and useful Attachment for Cooking Utensils, of which the following is a specification.

The invention relates to an attachment for cooking utensils.

The object of the present invention is to provide a simple, inexpensive, and efficient device, designed to be readily applied to pans, kettles, etc., and adapted to support a knife and fork or spoon to prevent the same from falling into the contents of a cooking utensil, and capable also of forming a rest for an ill-fitting lid or cover to prevent such closure from dropping into the receptacle, and of maintaining a pivoted handle or bail in an elevated position to prevent the same from being highly heated.

With these and other objects in view the invention consists in the construction and novel combination of parts hereinafter fully described, illustrated in the accompanying drawing, and pointed out in the claims hereto appended, it being understood that various changes in the form, proportion, size and minor details of construction, within the scope of the claims, may be resorted to without departing from the spirit or sacrificing any of the advantages of the invention.

In the drawing:—

Figure 1 is a plan view of an attachment constructed in accordance with this invention, and shown applied to a cooking utensil.

Fig. 2 is a front elevation of the same.

Fig. 3 is a perspective view of the device.

Fig. 4 is a side elevation of the attachment, the cooking utensil and the cover being shown in section.

Like numerals of reference designate corresponding parts in all the figures of the drawings.

In the accompanying drawing, in which is illustrated the preferred embodiment of the invention, the device is constructed from a single piece of wire or other suitable material, which is bent intermediate of its ends to form an inner approximately U-shaped jaw 1, composed of spaced vertical sides 2 and a connecting bottom portion 3. The sides 2 of the jaw 1 are adapted to fit against the inner face of the side wall 4 of a cooking utensil 5, as clearly illustrated in Fig. 4 of the drawing, and the lower terminal portions of the sides 2 are bent slightly away from the wall 4 of the receptacle, the bends 6 offsetting the connection portion 3 from the vertical plane of the straight sides 2. The inner jaw 1, which engages the interior of the receptacle 5 at spaced points, is connected with an outer jaw 7 by transverse connecting members 8, provided at their inner terminals with horizontally disposed approximately U-shaped bends 9, and at their outer ends with approximately vertical bends 10. The transverse connecting members form stops and rest upon the rim 11 of the receptacle 5, and coact with the inner and outer jaws in maintaining the attachment in a firm and steady position on the supporting wall of the receptacle 5. The inner horizontally disposed bends 9 extend laterally from the transverse connecting members 8 and connect the said members with the sides 2 of the inner jaw 1. These horizontal approximately U-shaped bends 9 also project inwardly from the inner face of the wall 4 of the receptacle, and they constitute spaced recesses which are adapted to receive the adjacent portion of a cover 5ª to support the same in position. By this construction an ill-fitting cover of slightly less diameter than the top of the cooking utensil is supported and is prevented from falling into the said receptacle. The outer bends 10, which extend downwardly from the transverse members 8, connect the latter with the outer jaw 7.

The outer jaw is composed of two approximately U-shaped loops 12, having their inner sides fitted together and secured within a sleeve 13. The sleeve 13, which is arranged in a substantially vertical position, is located between the transverse members 8 and extends downwardly to within a short distance of the lower terminal engaging portions of the outer jaw 7. The outer sides and the lower portions of the U-shaped loops of the outer jaw are arranged at an inclination and extend below the plane of the lower end of the inner jaw 1, and the said outer jaw engages the exterior of the receptacle 5 at the lower ends of its U-shaped loops. The particular arrangement of the inner and outer jaws enables them to be readily engaged with various kinds of cooking utensils, such as pots, kettles, frying pans, etc., and when the device is applied in position on a receptacle, the jaws firmly grip the same interiorly and exteriorly thereof.

The inner sides of the loops of the outer jaw are extended upwardly and are bowed laterally in opposite directions to form opposite spoon or fork receiving bends 14, and the latter provide a loop of sufficient size to receive the shank or stem portion of a fork or spoon, but too small to permit the handle of a fork or spoon to slip through it and fall into the contents of the receptacle. The bends constitute a central superimposed support and the sides of such support abut at the top of the same to close the mouth or entrance of the loop. The sides of the support above the abutting portions 15 are bent laterally in opposite directions to form a flaring mouth or entrance 16 and to provide approximately horizontal arms 17 and 18. The sides of the support also diverge below the abutting portions 15, as clearly shown in Fig. 3 of the drawing. By this construction a spoon 19 or fork (not shown) may be readily introduced into and removed from the loop of the superimposed support. The spoon 19 or a fork, when placed in the superimposed support, extends inwardly therefrom and rests upon the cover 5ª. The device maintains a fork or spoon in convenient position for instant use.

One terminal of the wire is bent to form an eye 20 at the outer terminal of the horizontally disposed laterally projecting arm 17, and a hook 21, which is also provided with an eye 22, is linked into the eye 20, whereby the hook is loosely connected with the device and is adapted to be readily engaged with and disengaged from the bail 23 of the utensil 5. The hook is preferably constructed of wire, and its outer portion is bent upon itself to provide a hook proper, which has its bill 24 curved to enable the bail 23 to be readily engaged with and disengaged from it. The terminal portion 24 of the hook is spaced from the shank of the latter a distance less than the thickness of the bail, so that the said terminal portion of the hook must be sprung outwardly in introducing the bail into the hook proper, and in removing it therefrom. The hook or link is adapted to support the bail in an upright position to prevent the same from becoming highly heated. The other laterally extending arm 18 connects the central superimposed support with a knife holder 25, approximately L-shaped in side elevation, and composed of straight vertical jaws 26 and a horizontally disposed approximately triangular supporting loop 27. The jaws 26 are adapted to engage and receive between them the blade of a knife (not shown), and the outer terminal portions of the said sides 26 slightly diverge to form a flaring entrance to enable a knife blade to be readily introduced into the holder. The triangular supporting loop 27 is composed of outwardly diverging sides and a transverse connection portion 28, having terminal bends 29 connecting it to the divergent sides and forming shoulders to hold the handle of a knife against lateral movement.

What is claimed is:

1. An attachment of the class described, formed of a single piece of wire, comprising inner and outer jaws arranged to engage the inner and outer faces of the wall of a receptacle, and a transverse connecting member for the jaws arranged to rest upon the upper edge of the receptacle, and provided with a looped portion arranged below the inner upper edge of the receptacle and extending inwardly a short distance to engage beneath the peripheral edge of the cover of said receptacle thereby forming a rest for said cover when it is in place upon the receptacle.

2. An attachment of the class described, including an approximately U-shaped inner jaw arranged to engage the inner face of the wall of a receptacle, an outer jaw, and transverse members connected at their outer terminals with the outer jaw and having their inner terminals bent laterally and forming horizontally disposed loops connected with the sides of the inner jaw and arranged to support a lid or cover.

3. An attachment of the class described including inner and outer jaws to engage the inner and outer faces of the wall of a receptacle, and spaced transverse members connecting the said jaws and provided with approximately horizontal loops projecting inwardly from the rim of the receptacle and extending below the upper inner edge of the receptacle forming rests arranged to support a lid or cover, and a spoon holder formed on the outer jaw and arranged between and supported above said horizontal loops, whereby the spoon is caused to lie between said loops and rest upon the cover.

4. An attachment for cooking utensils, comprising inner and outer jaws adapted to engage a rim of a vessel, the outer jaw being provided with vertical jaws to engage the blade of a knife, and a support formed by bending the lower ends of the jaws at an angle to said vertical jaws and at one side of the same for holding the knife handle.

5. An attachment for cooking utensils, comprising jaws adapted to engage the rim of a vessel, one of the jaws being provided with an extension having means formed therein for supporting a spoon, an arm extending from said extension and bent to form vertical jaws, and a horizontal support formed by bending the lower terminals of the vertical jaws, said vertical jaws and horizontal support being adapted to hold a knife.

6. An attachment for cooking utensils comprising an inner and an outer jaw, transverse members connecting the jaws together, said transverse members provided with inwardly extending loops forming a lid support, said outer jaw having a vertically disposed loop forming an article support, and a knife support provided on said outer jaw at one side of said article support.

7. An attachment of the class described, including inner and outer jaws connected together at their upper portions, a superimposed substantially vertical support consisting of opposite sides or bends forming a loop, one of the sides being provided with a laterally extending arm, and a knife holder composed of co-acting blade engaging jaws, one of the jaws being connected at the top of the laterally extending arm, and a supporting loop having sides connected to the lower terminals of the jaws.

8. An attachment of the class described, including depending inner and outer jaws arranged to engage the inner and outer faces of the wall of a receptacle, a superimposed support having opposite sides or bends consisting of extensions of one of the jaws and forming a loop to receive a spoon or fork, said sides or bends being provided at the top with a laterally extending arm, and a knife holder connected to the arm and having co-acting jaws engaging the blade of a knife.

9. An attachment of the class described, including inner and outer jaws adapted to engage the inner and outer wall of a receptacle, the inner jaw being provided with a support for holding a lid or cover, said outer jaw having a vertical extension, and a hook hinged to said vertical extension and arranged to hold a bail in elevated position.

10. An attachment of the class described, comprising jaws to clamp a receptacle, a rest projecting inwardly a short distance below the periphery of the cover of said receptacle to support the same, a spoon holder to support a spoon in a transverse position over the receptacle with the spoon resting upon said cover, and a hook hinged to one side of the spoon holder, and adapted to engage the bail of the receptacle to hold it in an elevated position, said parts being arranged and combined in a unitary structure.

In testimony, that I claim the foregoing as my own, I have hereto affixed my signature in the presence of two witnesses.

PETER WAGNER.

Witnesses:
 H. E. SOHN,
 GEO. W. CHAMBERLAIN.

Copies of this patent may be obtained for five cents each, by addressing the "Commissioner of Patents, Washington, D. C."